No. 860,023. PATENTED JULY 16, 1907.
C. W. FULTON.
MOUNTING FOR VEHICLE WHEELS.
APPLICATION FILED FEB. 29, 1904.

7 SHEETS—SHEET 1.

Witnesses:
Thomas Durant
Melville D. Church

Inventor:
Charles W. Fulton
By Church & Church
his attys.

No. 860,023. PATENTED JULY 16, 1907.
C. W. FULTON.
MOUNTING FOR VEHICLE WHEELS.
APPLICATION FILED FEB. 29, 1904.

7 SHEETS—SHEET 4.

Witnesses:
Thomas Durant
Melville D. Church

Inventor:
Charles W. Fulton,
by Church & Church
his Attys.

No. 860,023.  
PATENTED JULY 16, 1907.  
C. W. FULTON.  
MOUNTING FOR VEHICLE WHEELS.  
APPLICATION FILED FEB. 29, 1904.

7 SHEETS—SHEET 5.

Witnesses:  
Thomas Durant  
Melville D. Church

Inventor:  
Charles W. Fulton,  
by Church & Church  
his attys

No. 860,023. PATENTED JULY 16, 1907.
C. W. FULTON.
MOUNTING FOR VEHICLE WHEELS.
APPLICATION FILED FEB. 29, 1904.
7 SHEETS—SHEET 6.
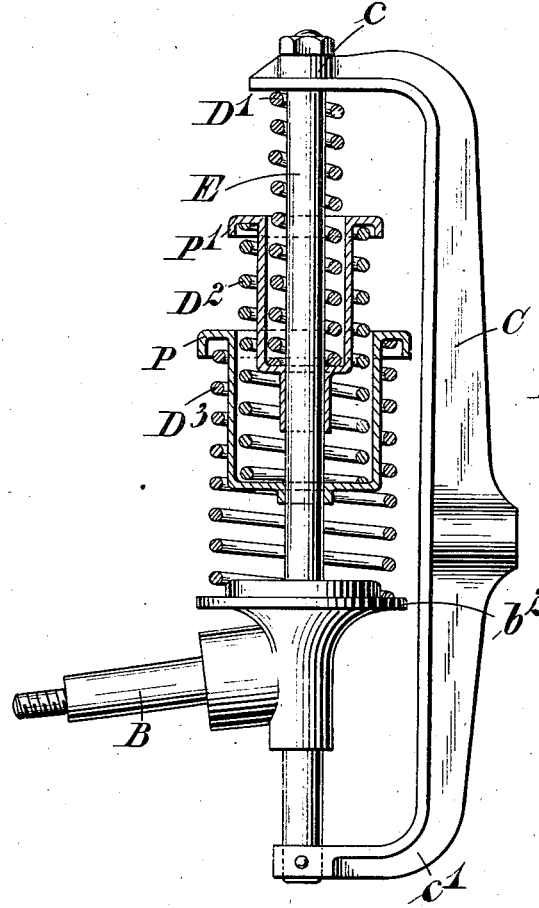
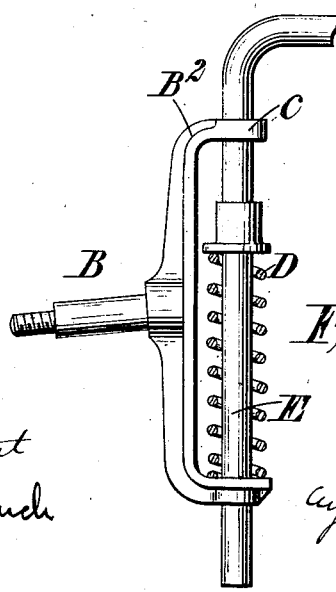
Witnesses:
Thomas Durant
Melville D. Church
Inventor:
Charles W. Fulton
by Church & Church
his attys No. 860,023. PATENTED JULY 16, 1907.
C. W. FULTON.
MOUNTING FOR VEHICLE WHEELS.
APPLICATION FILED FEB. 29, 1904.
7 SHEETS—SHEET 7.
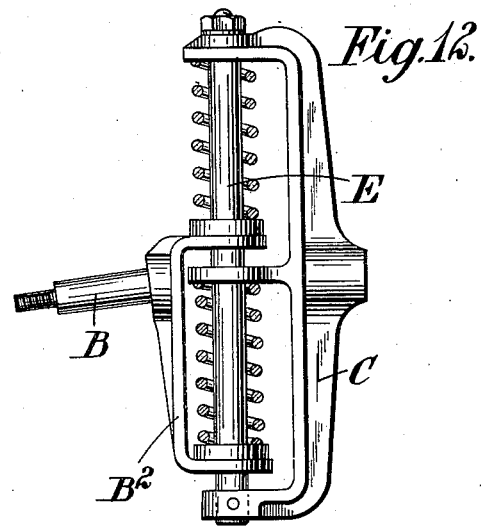
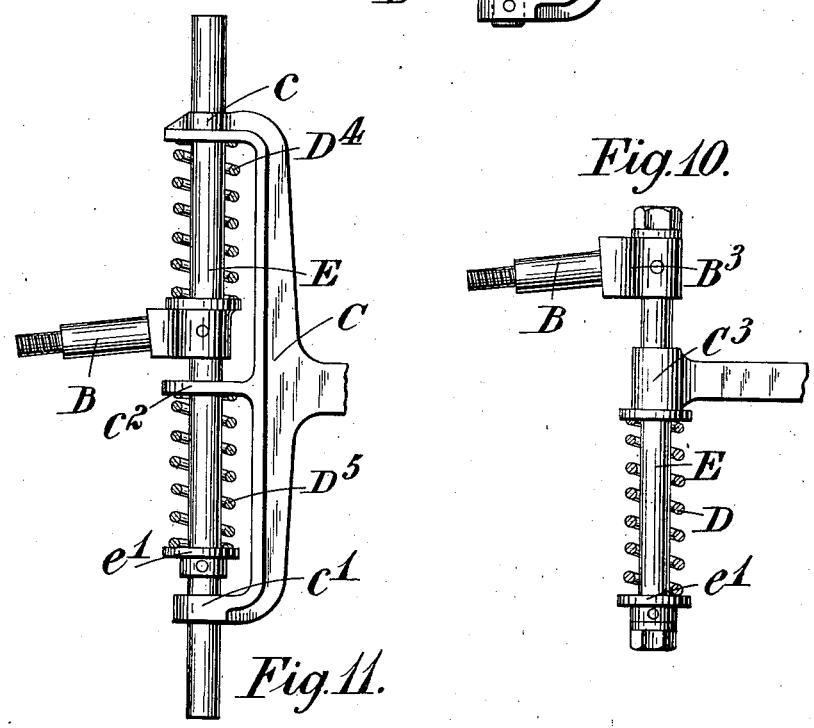
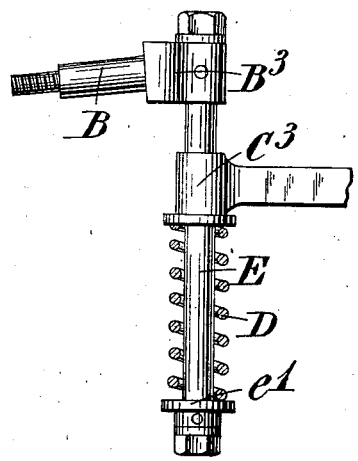
Witnesses
Inventor:
Charles W. Fulton,
his Attys

UNITED STATES PATENT OFFICE.

CHARLES WM. FULTON, OF PAISLEY, SCOTLAND.

MOUNTING FOR VEHICLE-WHEELS.

No. 860,023.　　　　　Specification of Letters Patent.　　　Patented July 16, 1907.

Application filed February 29, 1904. Serial No. 195,920.

*To all whom it may concern:*

Be it known that I, CHARLES WILLIAM FULTON, a subject of the King of Great Britain, and residing at Paisley, Renfrewshire, Scotland, have invented certain new and useful Improvements in or Relating to the Mounting of Road-Wheels for Vehicles, of which the following is a specification.

According to this invention each wheel is mounted on a pin or other appropriate axle supported in a bracket or knuckle and arranged to move vertically therein, and springs non-synchronous in their relative movements are disposed between the bracket and the wheel axle and between the bracket and the vehicle. The springs in the bracket are preferably over the point of contact between the wheel and the roadway.

Figure 1:
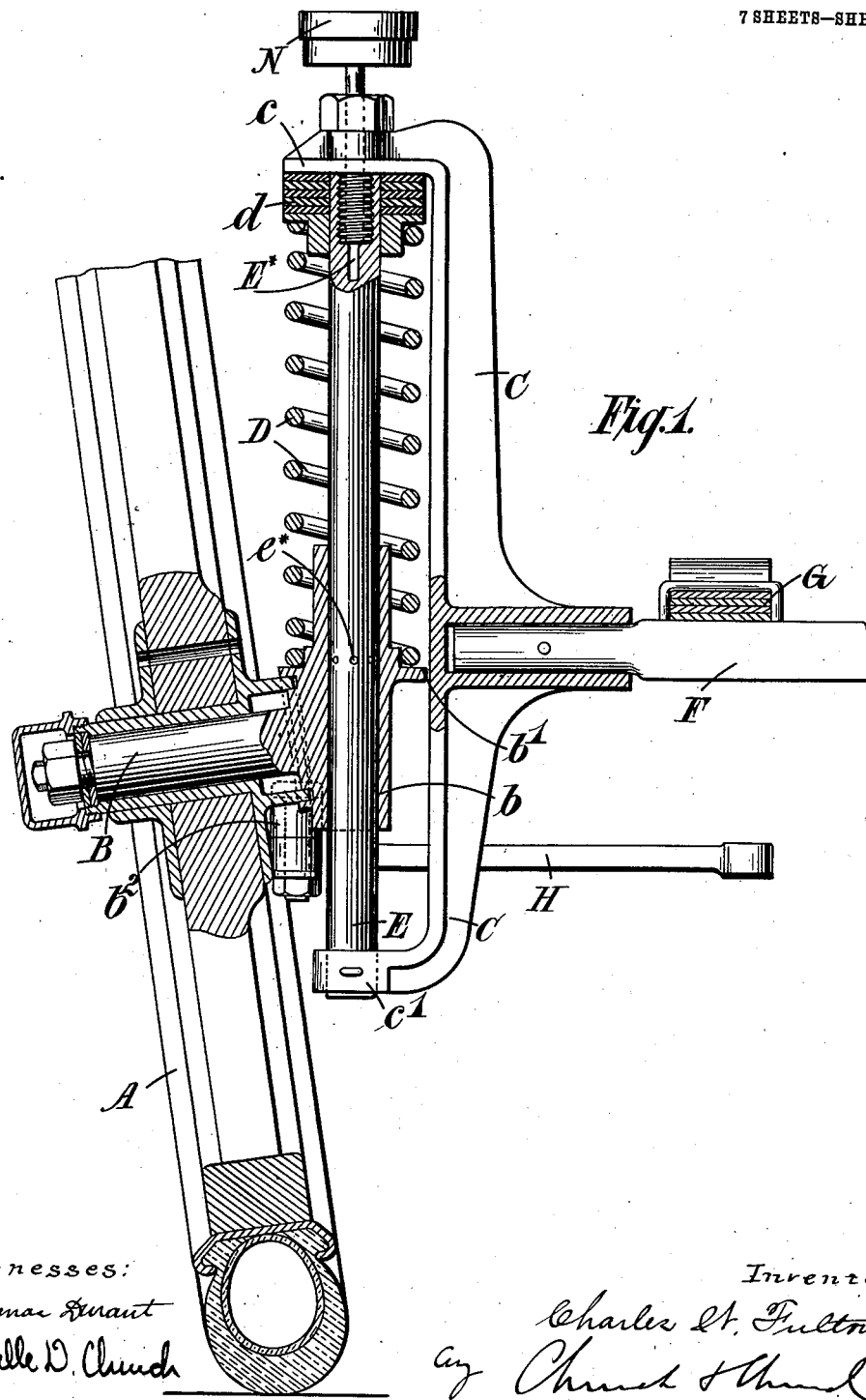
Figure 2:
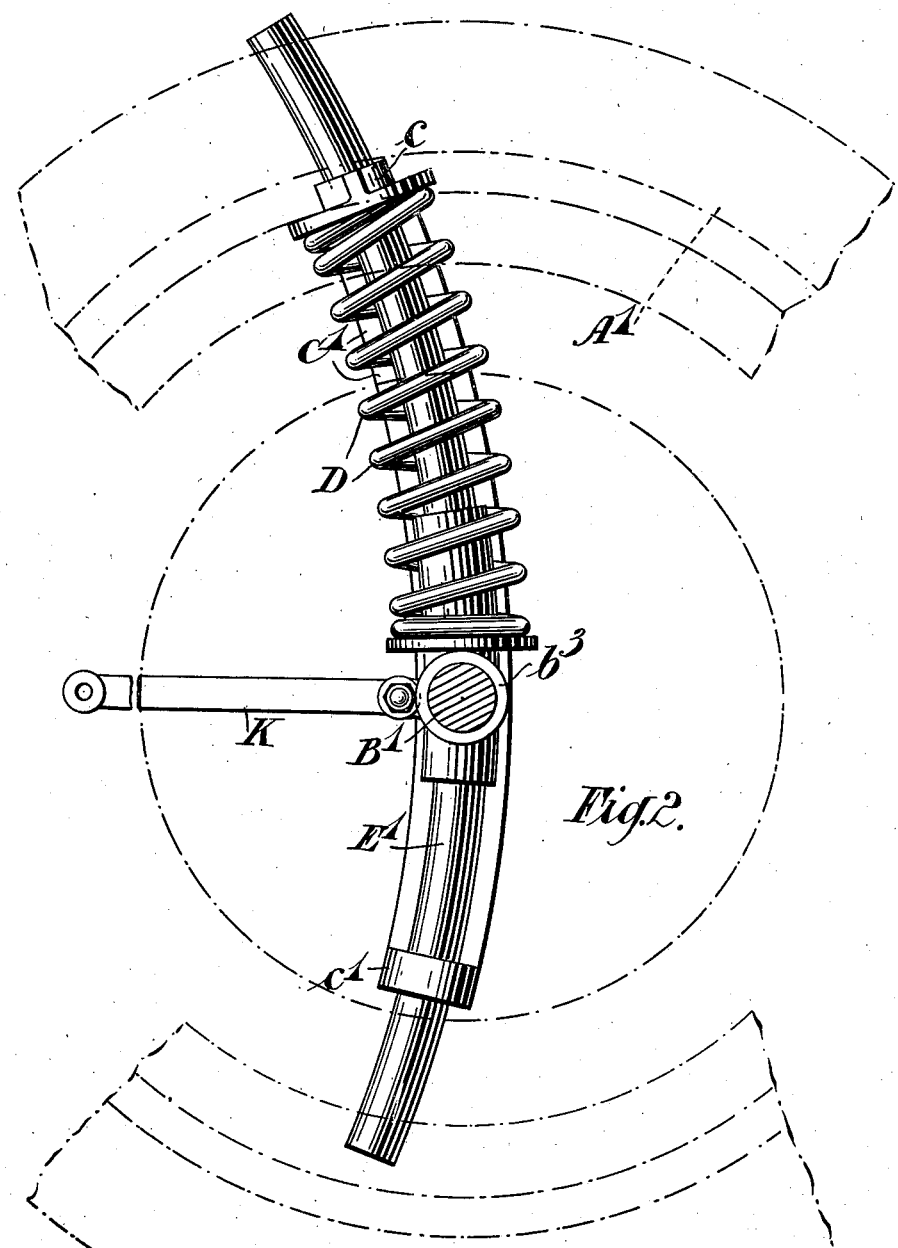
Figure 3:
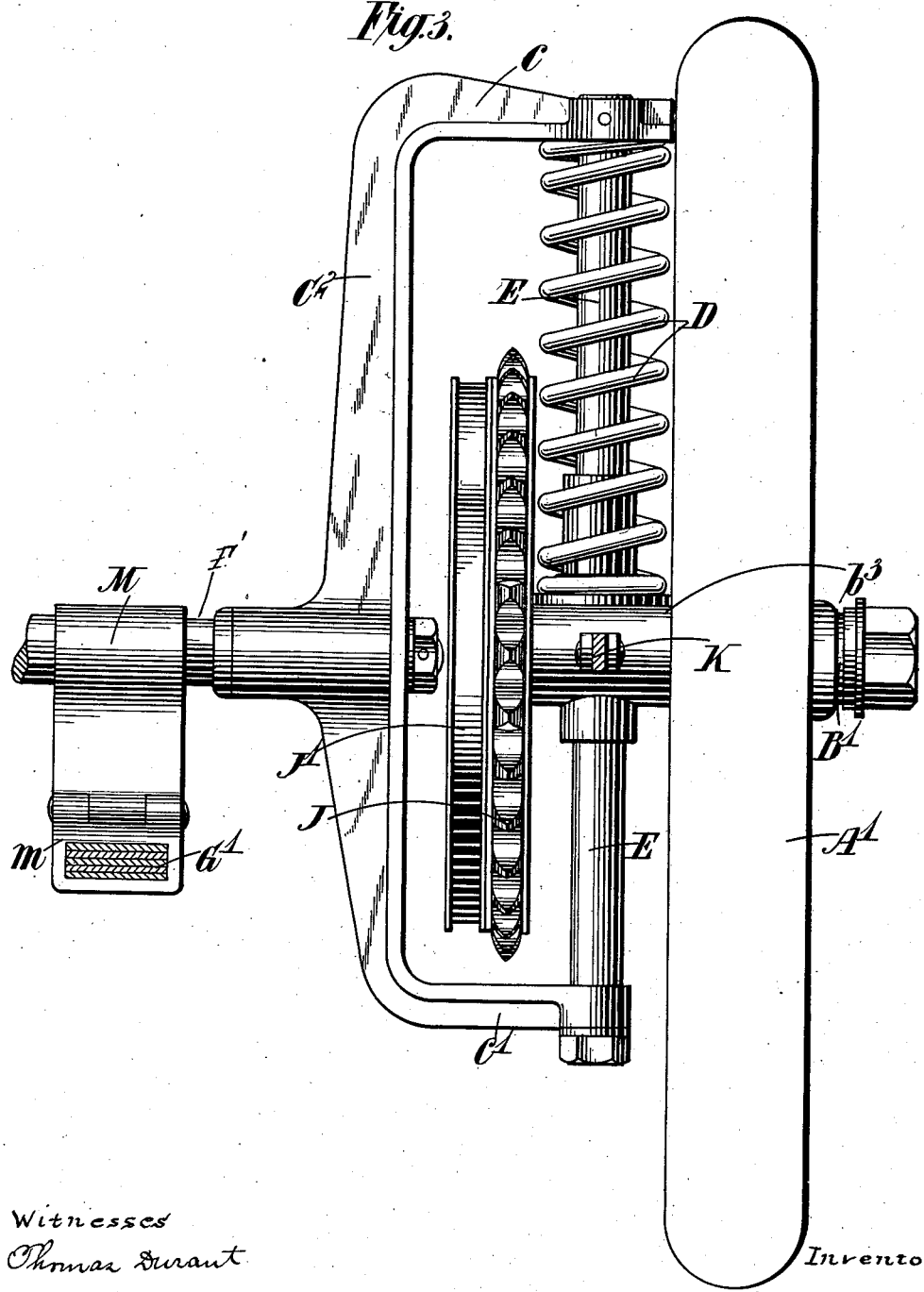
Figure 4:
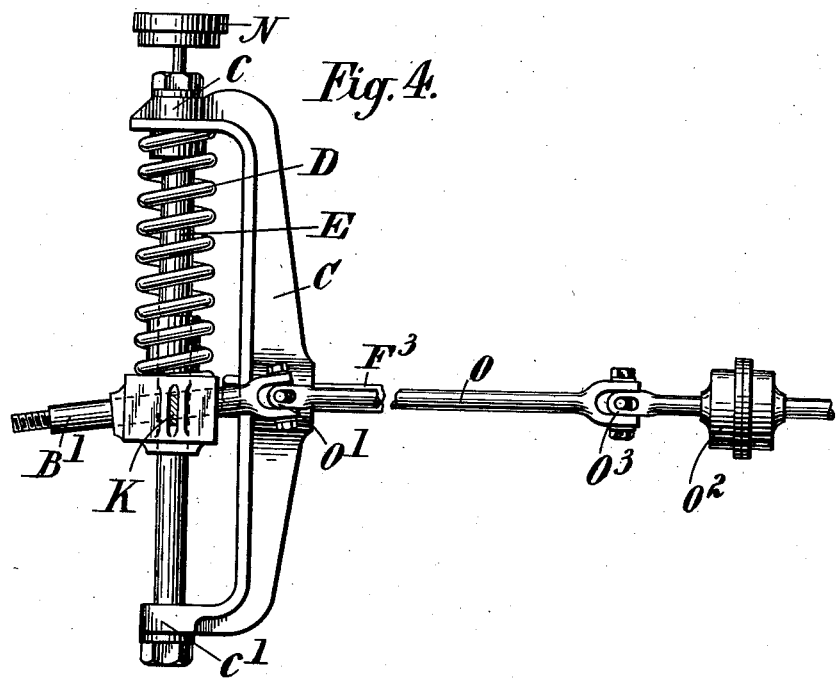
Figures 5, 7:
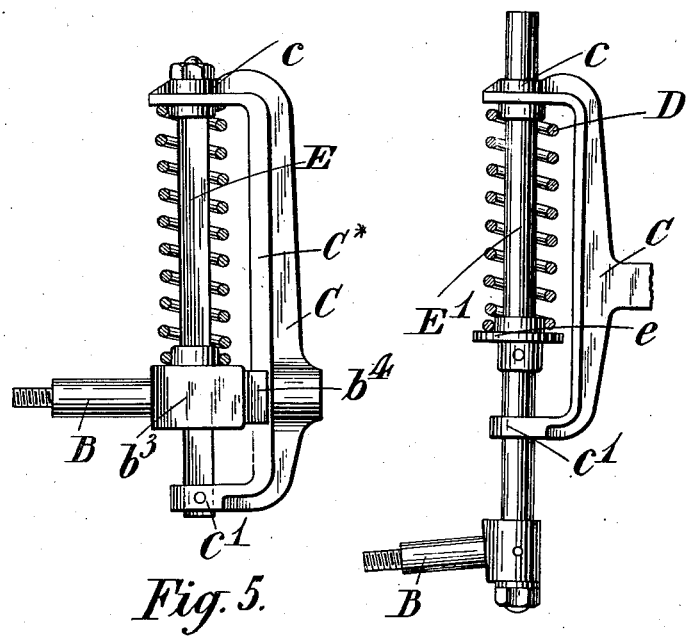
Figure 8:
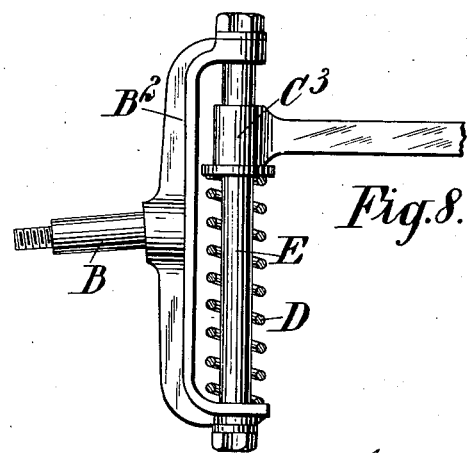

Referring to the drawings, Figure 1 is a sectional elevation of a preferred embodiment of the invention as applied to a steering wheel. Fig. 2 is a side elevation of an embodiment of the invention as applied to a driven wheel mounted on a stationary axle. Fig. 3 shows an alternative method of applying the invention to a driven wheel where the bracket is adapted to rock instead of curving the pins. Fig. 4 shows the invention applied to a wheel mounted on a "live" axle. Fig. 5 is a side elevation of a modified construction in which the radius rod is dispensed with and the wheel prevented from turning round the pins by a stop moving in a suitable guide way. Fig. 6 shows a modified construction which is adaptable to driven and non-driven and steering and non-steering wheels and shows a modification in which more than one spring is mounted between the wheel and the support. Fig. 7 shows a further modification in which the wheel axle is mounted outside the bracket. Fig. 8 shows a modification in which the bracket has only a single jaw and the wheel axle is provided with double jaws. Fig. 9 is a modification of the arrangement shown in Fig. 8 in which the bracket connected to the wheel is shown mounted beneath the axle. Fig. 10 shows a further modification in which the spring is mounted below both the wheel axle and the bracket. Fig. 11 shows a modification in which a spring is mounted both above and below the wheel axle. Fig. 12 is a further modification showing the employment of two springs.

Referring first of all to the construction applied to a steering wheel, as shown in Fig. 1, the wheel A is mounted on a pin or stud axle B which has a sleeve $b$ provided with a circular opening through which extends a pivot pin E. This pin fits the opening in such a manner as to permit the sleeve to slide freely along it and also to rotate round it. The pin E is secured at both its ends in the arms or jaws $c\ c'$ of the steering knuckle or bracket C. A spring D is disposed between a collar $b'$, carried by the sleeve $b$ and which may be adjustable to regulate the power of the spring, and the upper jaw $c$ of the bracket, the upper end of the spring bearing against rubber or other rings or washers $d$, which, however, may be dispensed with. The pin axle B may extend at right angles to the sleeve, but preferably it is directed downward as shown, so that the spring D is approximately over the point of contact of the wheel with the roadway. When the wheel passes over an obstruction it is thus free to move vertically against the action of the spring D and when the obstruction is passed the spring expands, so that the shock or jolt which otherwise would be transmitted to the body of the vehicle is absorbed by the spring. The rubber rings, when used, will absorb the shock consequent on the road wheel passing over small obstructions.

The bracket C in the example shown is pinned or it may be otherwise secured to the end of the ordinary spring supported cross axle F between which and the body of the vehicle are arranged the usual elliptic or C-springs G arranged to one side of the longitudinal axes of the vehicle. The springs D and G do not synchronize and this non-synchronizing action must be more than nominal, the respective beats of the springs must cross at a point which will have the effect of bringing the parts quickly and gradually to rest after the wheel has passed over an obstruction, thus preventing any tendency of the vehicle to rock or be upset.

The boss or sleeve $b$ of the axle B is provided with a short arm $b^2$ to which the lever H of the steering mechanism is connected. Preferably the boss or sleeve $b$ will be made in two parts, so that these may be bolted together and adjusted to take up wear. For convenience in lubricating the boss $b$ there is fitted to the upper end of the pin E a lubricator of any appropriate construction from which the lubricant passes by means of a central channel $E^\times$ in the pin to radial openings $e^\times$ and so passes between the pin E and the sleeve $b$.

In place of rigidly securing the pin in the bracket as above described and allowing the boss of the axle carrying the wheel to slide on it, the ends of the pin E may be extended through the bracket and be free to slide in suitable bearings in the arms $c\ c^1$, nuts or other stops being provided on the ends of the pin to prevent it from being drawn from its bearings.

A similar construction as above described may also be applied to non-steering wheels, as for instance, the rear or driven wheels of a motor vehicle, as shown in Fig. 2. In this case the spring supported stationary axle, which extends across the vehicle, has attached at each of its ends a bracket $C^1$ in which the road wheel $A^1$ is supported. The wheel $A^1$ is mounted on a pin axle $B^1$ which in this case extends through a sleeve $b^3$ carrying the pins $E^1$ mounted in the bracket $C^1$. The pin axle $B^1$ is free to rotate in its sleeve and carries at its inner end a driving pinion J and, if desired, the brake drum. To the sleeve $b^3$ is attached in any appropriate manner the radius rod K and in order that the pin or pins $E^1$, which in this case are free to slide in bearings in the arms $c$ $c^1$, may move freely, they are curved, as shown, to an arc of a circle determined by the length of the radius rod. Conveniently also the bracket $C^1$ itself is curved as shown. To aid in preventing the tendency of the wheel to rock or move at an angle to its axis, the pins $E^1$ may be made rectangular in cross section and pass through corresponding openings in the arms of the bracket. Or two pins moving in parallel planes may be employed. Or the pins $E^1$ may be replaced by a single pin rigidly secured to the bracket on which the sleeve on the wheel axle may be adapted to slide as in the case of the previous example, the pin of course passing through the sleeve in a different plane to the axle $B^1$.

An alternative arrangement, as applied to a driven wheel, is shown in Fig. 3, in which the pins E are straight, as in Fig. 1, and are rigidly secured in the bracket, or they may be free to slide therein, as already described. The bracket $C^2$ in this case is free to rock on the stationary cross axle $F^1$, so that the movement necessitated by the action of the radius rod when the wheel passes over an obstruction is compensated by the bracket rocking instead of, as in the previous case, the wheel moving on curved pins. The pin axle $B^1$ rotates in the sleeve $b^3$ and carries on its inner end toothed pinion J and brake drum $J^1$, as already described, the radius rod being attached to the sleeve $b^3$, as shown.

The axle $F^1$ on which the bracket $C^2$ is mounted extends across the vehicle to which it is connected by springs. At or near each end of the shaft is mounted a sleeve M having hinged or otherwise connected to it a loop $m$ for the reception of the ordinary C-spring $G^1$. This sleeve M may be free to move round the shaft or the spring may be free to move in the loop. The bracket is prevented from moving along the shaft by collars or otherwise and when the road wheel passes over an obstruction the bracket is constrained by the radius rod to move angularly and the loop $m$ permits the shaft to move laterally for the requisite distance.

Referring to the construction shown in Fig. 4 in which the wheel is attached to a "live axle," the knuckle C is carried by a stationary shaft $F^3$ running across the carriage and supported by elliptic springs, which are non-synchronous with the bracket springs. The live axle O has connected to it by means of a universal or other suitable joint $O^1$, the pin axle $B^1$ attached to the wheel not shown which may be inclined or it may be at right angles to its axle. The pin E on which the sleeve of the axle is adapted to move may be rigidly fixed in the bracket so that the sleeve moves on it, the movement being controlled by the spring D, or the pin E may be rigidly attached to the axle sleeve and adapted to move in bearings in the knuckle as already described. $O^2$ is a balance gear provided on the shaft which may be rotated in any appropriate manner and couplings $O^3$ are provided which permit the parts of the shaft to move axially independently of each other as the knuckle rocks when the wheel is passing over an obstruction. The couplings $O^1$ $O^3$ are so constructed as to permit slight axial movement of the parts.

Fig. 5 shows an embodiment of the invention as applied to a non-steering and non-driven wheel in which a radius rod is dispensed with. This construction corresponds practically with that already described with reference to Fig. 1, but the wheel is prevented from rotating round its pivot by a projection $b^4$ carried on the sleeve $b^3$ of the pin axle. This projection has a central groove adapted to move on a guide-way $C^\times$ which obviates the tendency of the wheel to move round the pin E. When the pin E is rigidly fixed in the bracket it may be rectangular or it may be free to move and adapted to pass through correspondingly shaped openings in the jaws of the bracket so as to aid in overcoming the tendency of the wheel to turn round the pivot.

The construction shown in Fig. 6 shows the use of more than one spring so that the effect of a single long spring is obtained. In this case the springs $D^1$, $D^2$, $D^3$ are mounted concentrically around the pin E which may be fixed in the bracket or adapted to move in bearings therein, as already described. The outer or largest spring $D^3$ has its lower end bearing against a collar $b^2$ attached to the pin axle and its upper end rests against a cup shaped member P in which is disposed the intermediate spring $D^2$, the lower end of which bears against the bottom of the cup P and its upper end bears against a flange on another cup $P^1$. The inner spring $D^1$ has its lower end bearing against the bottom of the cup $P^1$, its upper end bearing against the jaw $c$ of the bracket C. The springs are preferably non-synchronous in their relative movements in which case the bracket may be connected to the vehicle, but preferably the bracket is carried by an axle connected to the vehicle by springs which do not synchronize with the bracket springs.

In Fig. 7 the spring D rests between the upper jaw $c$ of the bracket C and an adjustable or other collar $e$ on the pin $E^1$ which moves in bearings in the jaws of the bracket and carries at its lower end the pin axle B for the wheel.

In the construction shown in Fig. 8 the bracket C is eplaced by a bracket $C^3$. The pin axle B in this case has mounted on it a bracket $B^2$ in which the pin E is mounted, or the pin E may be attached to the bracket $C^3$ so that the bracket $B^2$ slides thereon. The spring D is in this case disposed between the lower jaw of the bracket $B^2$ and the lower side of the bracket $C^3$. A modification of this construction is illustrated in Fig. 9 wherein the bracket $C^3$ is dispensed with and the end of the pin axle $f$ on which the bracket $B^2$ on the stud axle B moves is bent over at the upper side of the bracket to form the guide pin for the wheel axle.

The construction illustrated in Fig. 10 is a modification of that shown in Fig. 8, in that the bracket $B^2$ attached to the stud axle B is replaced by a single boss or hub $B^3$ to which the guide pin E is connected and provided with an adjustable collar $e^1$ between which and the support $C^3$ on the vehicle the spring D is disposed.

In Fig. 11 two springs $D^4$ $D^5$ are employed. In this case the bracket C is provided with an additional central jaw $c^2$ and the pin E is extended so as to slide in the jaws of the bracket. The pin axle B is secured firmly by its boss or hub to the pin and the spring $D^4$ is disposed between this hub and the upper jaw of the bracket, while the spring $D^5$ is disposed between a central jaw $c^2$ and the collar $e^1$ on the pin E.

In Fig. 12 a slight modification of Fig. 11 is shown and consists in that the boss attached to the pin axle referred to in the previous example is replaced by the bracket $B^2$ already described with reference to Fig. 8.

In the examples above described and shown in the drawings the springs are in compression, but as will be obvious these springs may be so arranged in any of the examples that they are in tension and it is not desired to limit the invention to the precise arrangements shown and described.

What I claim as my invention and desire to secure by Letters Patent is:—

1. In a mounting or suspension for vehicle wheels, the combination with a cross axle, a bracket on each end of the cross-axle and a pin or stud axle in each bracket for carrying the wheels, of a pin in each bracket an elongated sleeve secured to each stud axle at right angles thereto and surrounding the pin in the bracket, a quick vibrating spring between the stud axle and the bracket and surrounding the sleeve, and slow vibrating springs secured at their mid-points to the cross axle contiguous to each bracket, and secured at their ends to the vehicle, substantially as described.

2. In a mounting or suspension for vehicle wheels, the combination with a cross-axle, a bracket on each end of the cross-axle, and a pin or stud axle in each bracket for carrying the wheels of a pin in each bracket, an elongated sleeve secured to each stud axle and surrounding the pin in its corresponding bracket and capable of moving vertically upon and around the said pin, a quick-vibrating spring surrounding the sleeve and bearing upon the stud axle and the bracket, a slow vibrating spring secured at its mid-point at each end of the cross-axle, and at its ends to the vehicle, substantially as described.

3. In a mounting or suspension for vehicle wheels, the combination with an inclined or dipped stud-axle for each wheel, and an elongated sleeve attached to the stud-axle, of a cross axle a bracket at each end of the cross-axle a pin in each bracket passing through the elongated sleeve, a quick vibrating spring between each stud-axle and the bracket, against which the stud-axle can move, and a slow vibrating spring secured at its mid-point to the cross axle contiguous to each bracket and approximately over the point of contact of the wheel and the roadway and nonsynchronous with the spring in the bracket.

4. In a mounting or suspension for vehicle wheels the combination with a cross-axle, a bracket on each end of the cross-axle, and an inclined or dipped stud-axle for each wheel, of a guide-pin mounted in each bracket on which the stud-axle can move vertically a quick-vibrating coil-spring between each stud-axle and its bracket, and a slow vibrating elliptic spring, nonsynchronous with the coil-spring, attached at its mid-point to the cross axle contiguous to each bracket.

5. In a mounting or suspension for vehicle wheels, the combination with a stationary cross-axle, a bracket on each end of the cross axle, and an inclined or dipped stud-axle for each wheel of a guide pin in each bracket passing through its corresponding stud-axle, a system of springs in each bracket, an elliptic spring secured contiguous to each bracket at its mid-point to the cross-axle, and approximately over the point of contact of the wheel and the road way.

6. In a mounting or suspension for vehicle wheels the combination with a cross-axle, a bracket on each end of the cross-axle, and a guide pin in each bracket for the wheel axle, of a sleeve secured at right angles to the pin-axle which carries the wheel mounted on the guide pin upon which it can move vertically, a quick vibrating coil-spring between each pin-axle and its bracket a resilient ring between each coil-spring and its bracket, means for adjusting the spring, and a slow vibrating spring secured contiguous to each bracket at its mid-point to the axle and at its ends to the vehicle.

7. In a mounting or suspension for vehicle wheels, the combination with a cross-axle, a bracket on each end of the cross axle, and a pin or stud-axle in each bracket for carrying the wheels, of a spring between each bracket and its corresponding stud-axle, elliptic springs secured contiguous to each bracket to the cross axle, and at their ends to the vehicle, a guide pin in each bracket enabling the stud axle to move vertically in the bracket, and means for preventing the rotation of the wheel axle around the guide pin.

8. In a mounting or suspension for vehicle wheels the combination with a cross axle, a bracket on each end of the cross-axle, and a pin or stud-axle in each bracket for the wheels, of a pin in each bracket, an elongated sleeve secured to each stud-axle at right angles thereto, and surrounding the pin, a quick vibrating spring between each bracket and the stud-axle therein, and a slow vibrating spring secured at each end of the cross-axle contiguous to each bracket and to the vehicle and nonsynchronous with the spring in the bracket, and means for rotating the wheels.

9. In a mounting or suspension for vehicle wheels the combination with a cross-axle, a bracket on each end of the cross-axle, and a pin or stud-axle in each bracket for the wheels of a guide pin in each bracket, an elongated sleeve secured to each stud-axle at right angles thereto and surrounding the pin, a quick vibrating spring between each bracket and the stud-axle therein, and a slow vibrating spring secured at each end of the cross axle contiguous to each bracket and secured at their ends to the vehicle, said slow vibrating springs being nonsynchronous with the springs in the brackets and arranged approximately over the point of contact of the wheels and the roadway, and means for rotating the wheels.

In testimony whereof I have signed my name to this specification in the presence of two subscribing witnesses.

CHAS. WM. FULTON.

Witnesses:
 WM. J. DOW,
 HARRY B. BRIDGE.